US011015917B2

(12) United States Patent
Thimirachandra

(10) Patent No.: US 11,015,917 B2
(45) Date of Patent: May 25, 2021

(54) METHOD AND APPARATUS FOR DIMENSIONING OBJECTS

(71) Applicant: Zebra Technologies Corporation, Lincolnshire, IL (US)

(72) Inventor: Sanjeewa Thimirachandra, Kotugoda (LK)

(73) Assignee: Zebra Technologies Corporation, Lincolnshire, IL (US)

( * ) Notice: Subject to any disclaimer, the term of this patent is extended or adjusted under 35 U.S.C. 154(b) by 246 days.

(21) Appl. No.: 16/189,574

(22) Filed: Nov. 13, 2018

(65) Prior Publication Data

US 2020/0149870 A1    May 14, 2020

(51) Int. Cl.
  *G01B 11/03* (2006.01)
  *G01B 11/25* (2006.01)
  *G06T 7/60* (2017.01)
  *G06T 7/13* (2017.01)

(52) U.S. Cl.
  CPC ............ *G01B 11/03* (2013.01); *G01B 11/254* (2013.01); *G01B 11/2509* (2013.01); *G06T 7/13* (2017.01); *G06T 7/60* (2013.01)

(58) Field of Classification Search
  CPC ... G01B 11/03; G01B 11/2509; G01B 11/254; G01B 11/00; G06T 7/13; G06T 7/60; G06T 2207/30108; G06T 7/181; G06T 7/62
  USPC ........................................................ 356/614
  See application file for complete search history.

(56) References Cited

U.S. PATENT DOCUMENTS

| | | | |
|---|---|---|---|
| 2009/0040532 A1* | 2/2009 | Kawasaki .......... | G01B 11/2513 356/610 |
| 2009/0297055 A1* | 12/2009 | Panda .................. | G06K 9/4609 382/249 |
| 2015/0177370 A1* | 6/2015 | Trummer .................. | G01S 7/51 356/5.01 |
| 2015/0269742 A1* | 9/2015 | Bergstrom ................ | G06T 5/50 348/164 |
| 2017/0336198 A1* | 11/2017 | Adel ..................... | G01B 11/272 |
| 2018/0349862 A1* | 12/2018 | Ripley ................... | G06Q 10/20 |
| 2019/0279380 A1* | 9/2019 | Bendall .................. | G01B 11/24 |

* cited by examiner

*Primary Examiner* — Sunghee Y Gray

(57) ABSTRACT

A method of dimensioning an object includes: projecting, from a plurality of laser emitters disposed on a dimensioning device and having a predefined spatial arrangement forming a plane, respective laser beams onto a surface of the object, the laser beams oriented parallel to each other; controlling an image sensor of the dimensioning device, simultaneously with the projecting, to capture image data representing the surface and projections of the laser beams on the surface; detecting projection pixel coordinates in the image data representing the projections of the laser beams on the surface; detecting edge pixel coordinates in the image data representing edges of the surface; and determining a dimension of the surface based on the projection pixel coordinates, the edge pixel coordinates, and the predefined spatial arrangement.

20 Claims, 6 Drawing Sheets

METHOD AND APPARATUS FOR DIMENSIONING OBJECTS

BACKGROUND

Objects such as packages come in all shapes and sizes and may need to be dimensioned, for example for them to be stored. Typically, an operator can dimension an object manually, for example by using a tape measure. Such manual dimensioning operations is a time-consuming and error-prone process.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
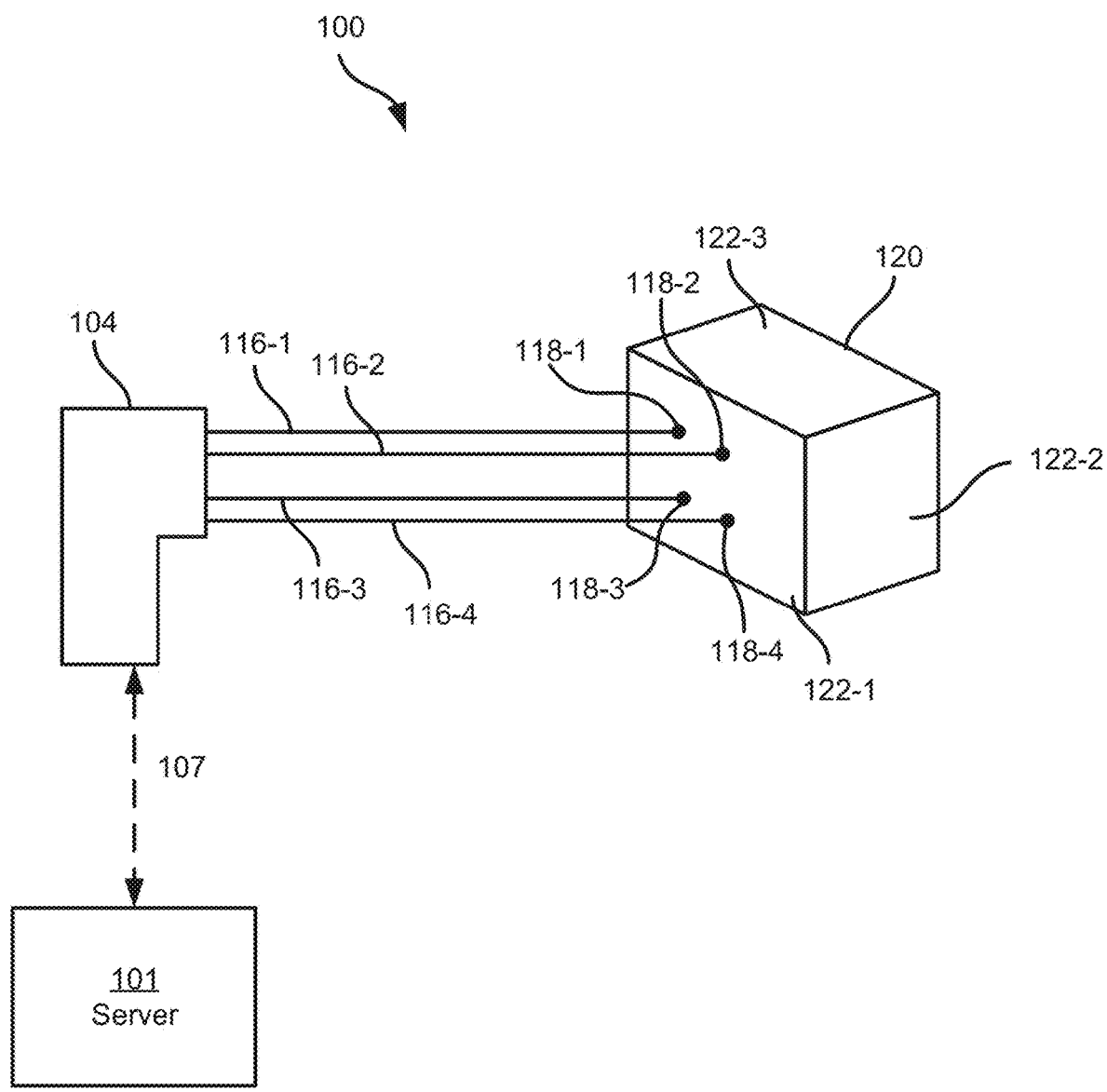
FIG. 1 is a schematic of a dimensioning system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of dimensioning an object comprising: projecting, from a plurality of laser emitters disposed on a dimensioning device and having a predefined spatial arrangement forming a plane, respective laser beams onto a surface of the object, the laser beams oriented parallel to each other; controlling an image sensor of the dimensioning device, simultaneously with the projecting, to capture image data representing the surface and projections of the laser beams on the surface; detecting projection pixel coordinates in the image data representing the projections of the laser beams on the surface; detecting edge pixel coordinates in the image data representing edges of the surface; and determining a dimension of the surface based on the projection pixel coordinates, the edge pixel coordinates, and the predefined spatial arrangement.

Additional examples disclosed herein are directed to a dimensioning device comprising: a plurality of laser emitters disposed on the dimensioning device and having a predefined spatial arrangement forming a plane, the laser emitters configured to project respective laser beams oriented parallel to each other; an image sensor disposed on the dimensioning device configured to capture image data representing projections of the laser beams; and a dimensioning processor configured to: control the laser emitters to project the respective laser beams onto a surface of an object; control an image sensor simultaneously with the projecting, to capture image data representing the surface and projections of the laser beams on the surface; detect projection pixel coordinates in the image data representing the projections of the laser beams on the surface; detect edge pixel coordinates in the image data representing edges of the surface; and determine a dimension of the surface based on the projection pixel coordinates, the edge pixel coordinates, and the predefined spatial arrangement.

Additional examples disclosed herein are directed to a non-transitory computer-readable medium storing a plurality of computer-readable instructions executable by a dimensioning controller, wherein execution of the instructions configures the dimensioning controller to: project, from a plurality of laser emitters disposed on a dimensioning device and having a predefined spatial arrangement forming a plane, respective laser beams onto a surface of the object, the laser beams oriented parallel to each other; control an image sensor of the dimensioning device, simultaneously with the projecting, to capture image data representing the surface and projections of the laser beams on the surface; detect projection pixel coordinates in the image data representing the projections of the laser beams on the surface; detect edge pixel coordinates in the image data representing edges of the surface; and determine a dimension of the surface based on the projection pixel coordinates, the edge pixel coordinates, and the predefined spatial arrangement.

FIG. 1 depicts a dimensioning system 100 in accordance with the teachings of this disclosure. The system 100 includes a server 101 in communication with a dimensioning device 104 (also referred to herein simply as the device 104) via a communication link 107, illustrated in the present example as including wireless links. In the present example, the link 107 is provided by a wireless local area network (WLAN) deployed by one or more access points (not shown). In other examples, the server 101 is located remote from the dimensioning device, and the link 107 therefore includes wide-area networks such as the Internet, mobile networks, and the like.

The system 100 is deployed, in the illustrated example, to dimension a box 120 having surfaces 122-1, 122-2 and 122-3 (collectively referred to as surfaces 122, and generically referred to as a surface 122—this nomenclature is also employed for other elements discussed herein). In other examples, the system 100 can be deployed to dimension other objects having various shapes (e.g. a cylindrical shape).

Figure 2A:
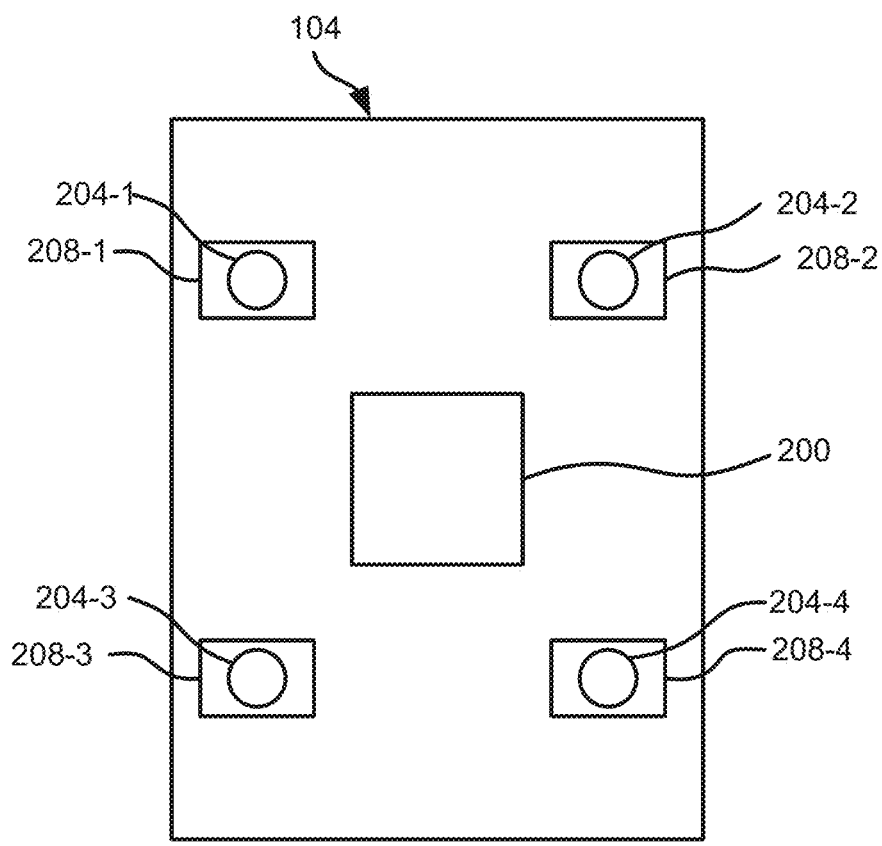
FIG. 2A depicts a dimensioning device in the system of FIG. 1.
Figure 2B:
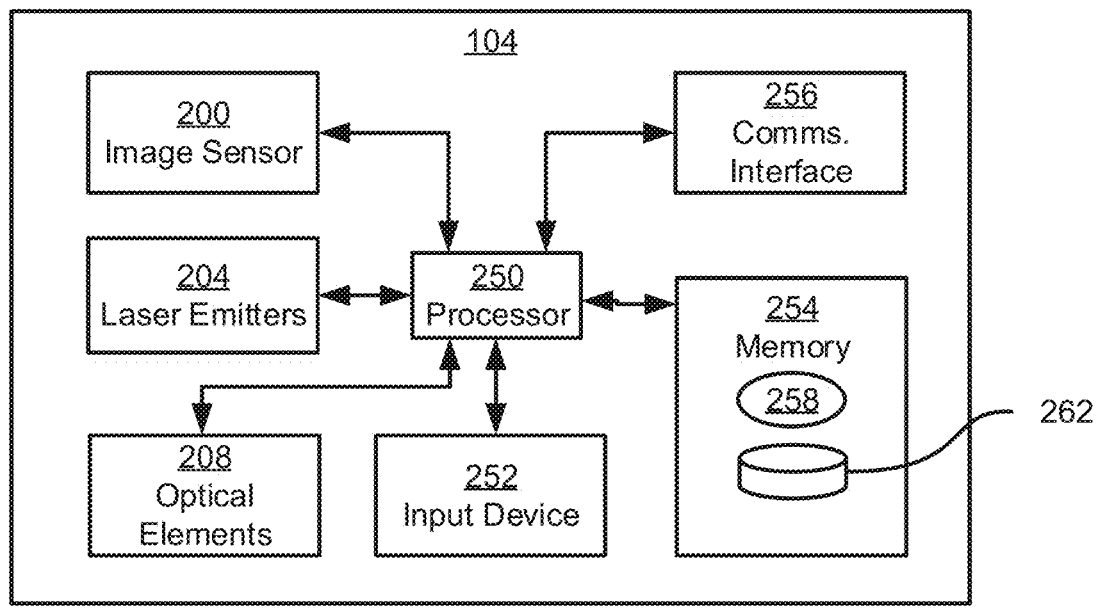
FIG. 2B is a block diagram of certain internal components of the dimensioning device the system of FIG. 1.

Turning now to FIGS. 2A and 2B, the dimensioning device 104 is shown in greater detail. Referring to FIG. 2A, a front view of the dimensioning device 104 is shown. The dimensioning device 104 includes an image sensor 200 and a plurality of laser emitters 204-1, 204-2, 204-3, and 204-4.

The device 104 can also include diffractive optical elements 208-1, 208-2, 208-3, and 208-4 associated with the respective laser emitters 108.

The laser emitters 204 are disposed on the device 104 and have a predefined spatial arrangement forming a plane (i.e. three or more laser emitters 204 in a non-linear arrangement). In the present example, the device 104 includes four laser emitters 204 arranged in a rectangular spatial arrangement. In other examples, the device 104 can include three laser emitters 204 forming, for example, an equilateral triangle. In particular, the spatial arrangement of the laser emitters 204 (i.e. the angles and distances between the laser emitters 204), as well as the position of the image sensor 200 relative to each of the emitters 204, is known (e.g. stored in the device 104 or at the server 101).

Returning to FIG. 1, the laser emitters 204 are configured to emit laser beams 116-1, 116-2, 116-3, and 116-4 in a direction towards the object (i.e. the box 120) toward which the device 104 is oriented for dimensioning. More particularly, the laser emitters 204 are configured to emit laser beams 116 parallel to each other. The laser beams 116 are projected onto the surface 122-1 of the box 120 to define projections 118-1, 118-2, 118-3, and 118-4 on the surface 122-1. Since the laser beams 116 are parallel to each other, the projections 118 maintain the same predefined spatial arrangement (i.e. both in distance and angle relative to each other) within any plane parallel to that of the emitters 204.

Referring again to FIG. 2A, the image sensor 200 is disposed on the device 104 and is configured to capture image data representing at least the object (e.g. the box 120) toward which the device 104 is oriented for dimensioning. More particularly, in the present example, the image sensor 200 is configured to capture image data representing the box 120, including at least the surface 122-1 and the projections 118 on the surface 122-1. The image sensor 200 can be for example a digital color camera (e.g. configured to generate RGB images), a greyscale camera, an infrared camera, an ultraviolet camera, or a combination of the above. The image sensor 200 has a constant k which defines the relationship between an object of height h placed a distance d away from the image sensor 200, and its respective height m in the resulting image. In particular, for an object with a known height h placed a known distance d, resulting in an image height m, the constant k can be defined as the ratio of the distance d multiplied by the image height m to the object height h. The constant k can then be used to determine the distance to the image sensor 200 when the object of height h is placed a distance n away from the image sensor 200.

Also shown in FIG. 2A are the optical elements 208 associated with the laser emitters 204. The optical elements 208 are configured to interact with the laser beams 116 to form laser planes. The projections 118 therefore appear as lines on the surface 122-1. In some implementations, the optical elements 208 can be omitted or configured to be disabled.

Turning now to FIG. 2B, certain internal components of the device 104 are shown. The device includes a special-purpose controller, such as a processor 250 interconnected with a non-transitory computer readable storage medium, such as a memory 254. The memory 254 includes a combination of volatile memory (e.g. Random Access Memory or RAM) and non-volatile memory (e.g. read only memory or ROM, Electrically Erasable Programmable Read Only Memory or EEPROM, flash memory). The processor 250 and the memory 254 each comprise one or more integrated circuits.

The memory 254 stores computer readable instructions for execution by the processor 250. In particular, the memory 254 stores a control application 258 which, when executed by the processor 250, configures the processor 250 to perform various functions discussed below in greater detail and related to the dimensioning operation of the device 104. The application 258 may also be implemented as a suite of distinct applications in other examples. The processor 250, when so configured by the execution of the application 258, may also be referred to as a controller 250. Those skilled in the art will appreciate that the functionality implemented by the processor 250 via the execution of the application 258 may also be implemented by one or more specially designed hardware and firmware components, such as field-configurable gate arrays (FPGAs), application-specific integrated circuits (ASICs) and the like in other embodiments. In an embodiment, the processor 250 is a special-purpose dimensioning processor which may be implemented via dedicated logic circuitry of an ASIC, an FPGA, or the like in order to enhance the processing speed of the dimensioning calculations discussed herein.

The memory 254 also stores a repository 262 containing, for example, device data for use in dimensioning objects. The device data can include the spatial arrangement (i.e. the distances and angles) of the laser emitters 208 and the image sensor 200 on the device 104, as well as the constant k of the image sensor 200. In some examples, the repository 262 can also include image data captured by the image sensor 200 and object data, such as an object identifier, and object dimensions recorded upon completion of the dimensioning operation by the device 104.

The device 104 also includes a communications interface 256 interconnected with the processor 250. The communications interface 256 includes suitable hardware (e.g. transmitters, receivers, network interface controllers and the like) allowing the device 104 to communicate with other computing devices—particularly the server 101—via the link 107. The specific components of the communications interface 256 are selected based on the type of network or other links that the device 104 is required to communicate over. The device 104 can be configured, for example, to communicate with the server 101 via the link 107 using the communications interface 256 to send and receive object data, image data and device data to the server 101.

As shown in FIG. 2B, the processor 250 is connected to the image sensor 200, the laser emitters 204 and the optical elements 208. The processor 250 is enabled, via such connections, to issue commands for performing a dimensioning operation. Specifically, the processor 250 can control the laser emitters 204 to project the laser beams 116 onto the object, and the image sensor 200 to capture image data representing the object and the projections 118 on the surface of the object. The processor 250 can further be configured to control the optical elements 208 to interact with the laser beams 116 to form laser planes for projecting line projections 118 on the surface of the object. The processor 250 can also be configured to disable the optical elements 208 from interacting with the laser beams 116. The processor 250 is also connected to an input device 252 for receiving input from an operator. The input device 252 can be, for example, a trigger button, a touch screen, or the like.

Figure 3:
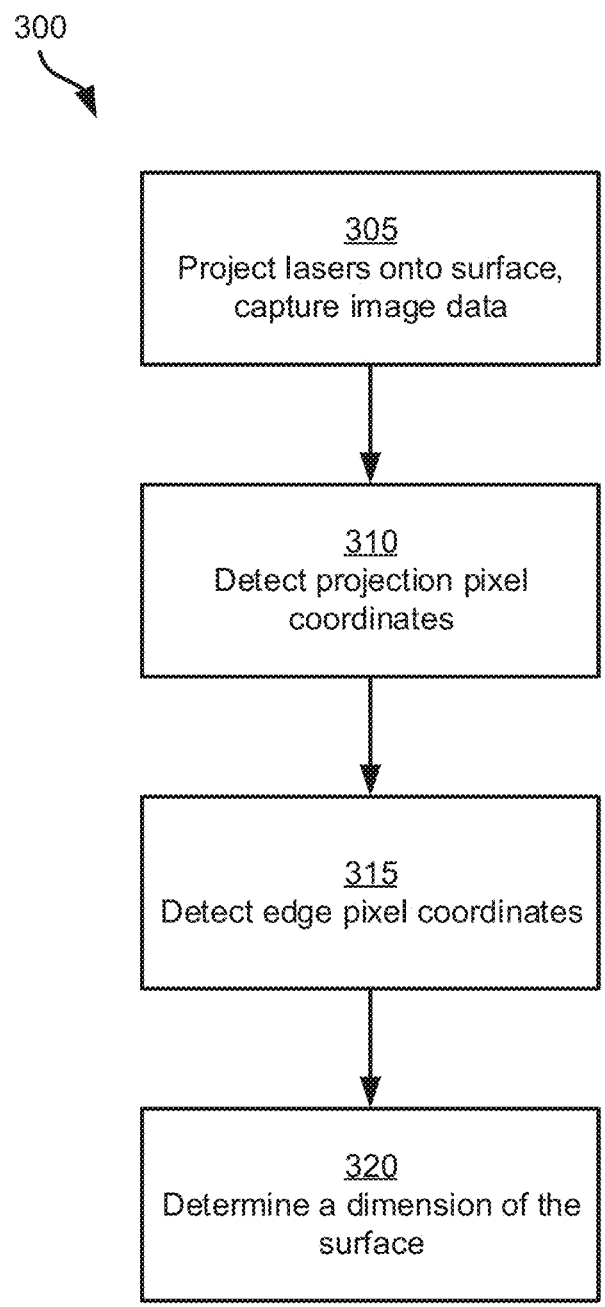
FIG. 3 is a flowchart of a method for dimensioning objects.

The functionality of the device 104, as implemented via execution of the application 258 by the processor 250 will now be described in greater detail, with reference to FIG. 3. FIG. 3 illustrates a method 300 of dimensioning objects, which will be described in conjunction with its performance in the system 100, and in particular by the device 104, with reference to the components illustrated in FIGS. 2A and 2B.

The method 300 begins at block 305, in response to an initiation signal, such as an input at the input device 252. For example, an operator may trigger a trigger button to initiate the method 300. At block 305, the device 104 is configured to project, from the laser emitters 204, the respective laser beams 116 onto the surface 122-1 of the box 120. The laser beams 116 define the projections 118 on the surface 122-1. The device 104 is also configured, at block 305, to control the image sensor 200, simultaneously with the projecting, to capture image data representing the surface 122-1 and projections 118 of the laser beams 116.

Figure 4A:
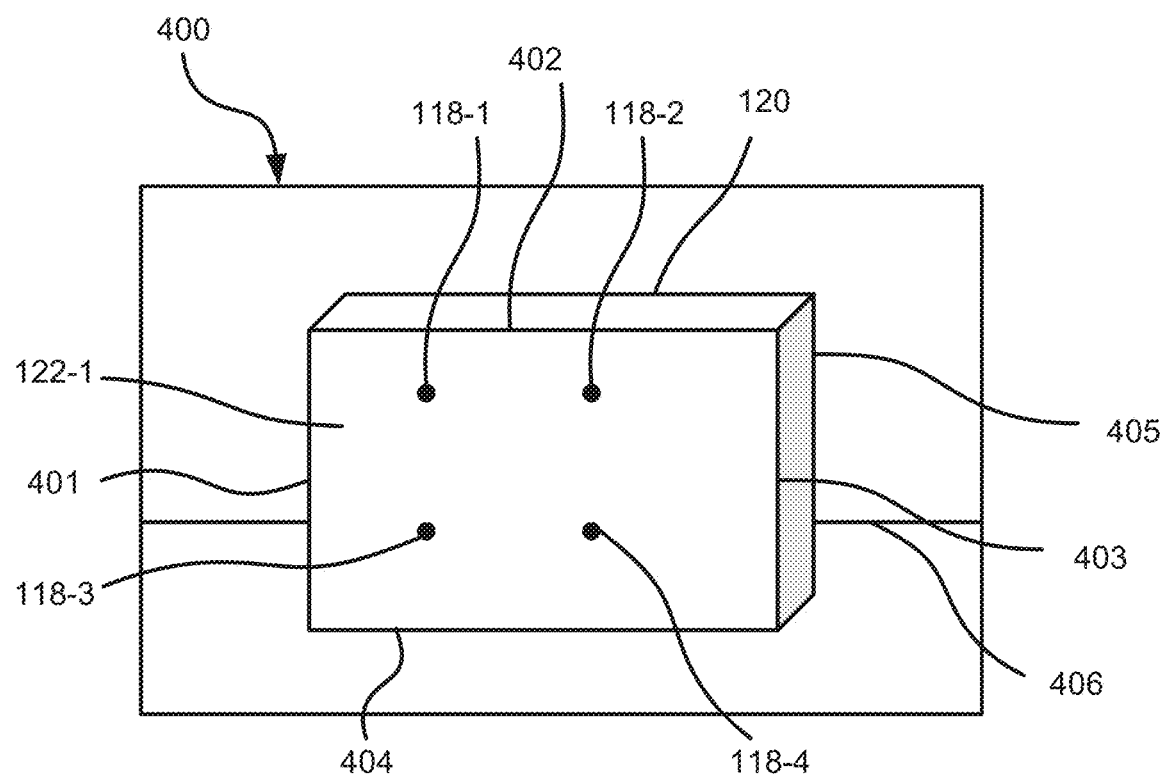
FIGS. 4A and 4B illustrate an example images captured during performance of the method of FIG. 3.
Figure 4B:
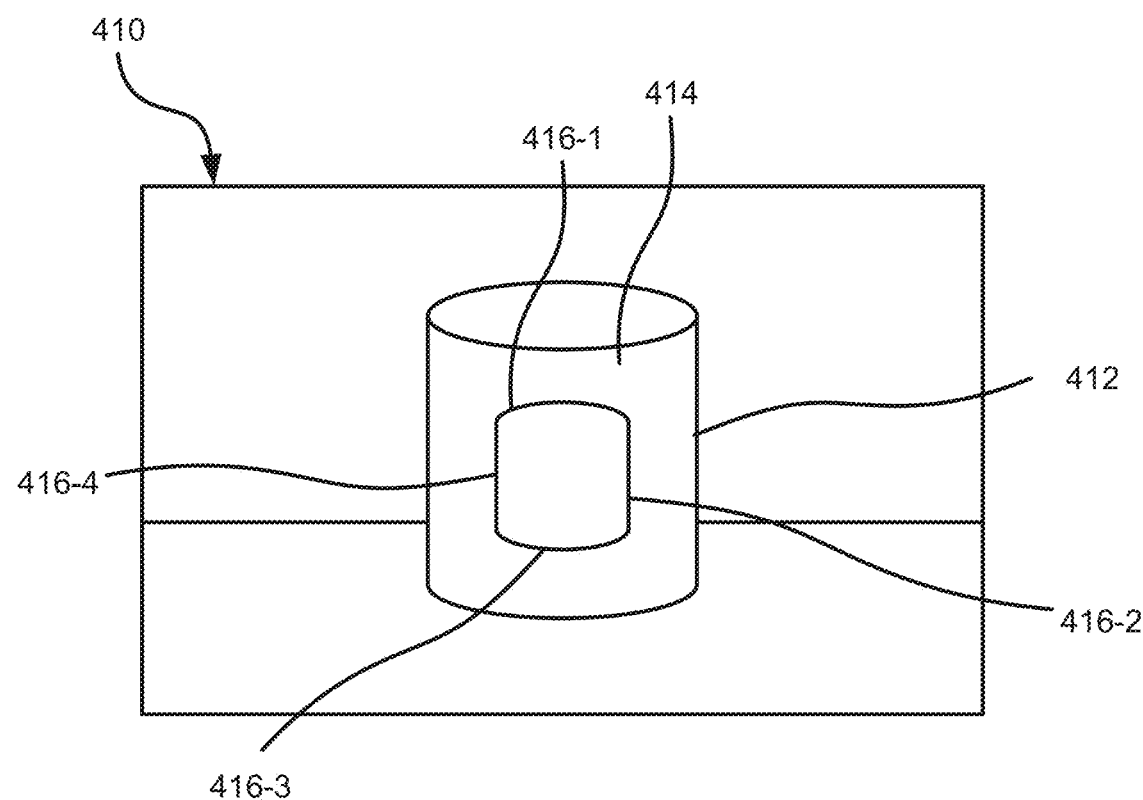

For example, referring to FIG. 4A, an example image 400 captured at block 305 is shown. The example image 400 includes the box 120, and particularly the surface 122-1 having the projections 118. FIG. 4B depicts another example image 410 captured at block 305. The example image 410 depicts a cylinder 412 for dimensioning. In particular, the cylinder 412 has a curved surface 414. The processor 250 is configured to control the optical elements 208 to interact with the laser beams 116 to form laser planes. For example, the processor 250 can enable or disable the optical elements 208 in response to a selection by an operator at the input device 252. Accordingly, the projections 416-1, 416-2, 416-3, and 416-4 appear as lines on the curved surface 414.

At block 310, the device 104 is configured to detect projection pixel coordinates. In other words, the device 104 is configured to detect portions of the image data representing the projections 118 on the surface 122-1. For example, the device 104 can be configured to identify regions of the image data having a predefined color (e.g. by comparing RGB values to predetermined threshold values to detect the predefined color of the laser projection, for example, as stored in the memory 254). The device 104 can additionally be configured to detect particular shapes of the projections 118 (e.g. a line or a dot, based on the processor 250 enabling or disabling the optical elements 208). For example, in the example illustrated in FIG. 4B, the device 104 can be configured to detect lines (straight or curved). In other examples, the device 104 can employ other image analysis algorithms and techniques to detect the projections 118. The device 104 is then configured to assign coordinate values to those portions, for example based on the pixel coordinates from the image captured by the image sensor 200. More generally, the device 104 defines a coordinate system for the image data to allow for distance and angle calculations within the image data.

At block 315, the device 104 is configured to detect edge pixel coordinates. In other words, the device 104 is configured to detect portions of the image data representing edges, and more particularly, edges of the surface 122-1. For example, the device 104 can be configured to use edge detecting algorithms (e.g. by detecting gradient changes or the like) to detect edges in the image data. The device 104 can additionally be configured to filter detected edges according to the projection pixel coordinates detected at block 310. For example, the device 104 can select edges forming the smallest closed shape including all the projection pixel coordinates as the edges defining the surface 122-1. The remaining edges representing background information, such as a surface on which the box 120 is supported, or non-adjacent edges of the surfaces 122-2 or 122-3 may be filtered out. Thus, the edges nearest to the projection pixel coordinates may be selected as defining the edges of the surface 122-1. For example, referring to FIG. 4A, edges 401, 402, 403, and 404 may be selected as defining the edges of the surface 122-1, while box edge 405 and background edge 406 may be filtered out. The device 104 is then configured to assign coordinate values to those portions using the same coordinate system as at block 310 to allow for consistent distance and angle calculations within the image data.

Referring again to FIG. 3, at block 320, the device 104 is configured to determine a dimension of the box 120, and more particularly, of the surface 122-1. For example, the device 104 can determine a length, width or height of the surface 122-1, corresponding to a length, depth or height of the box 120. In particular, the device 104 is configured to determine the dimension based on the projection pixel coordinates, the edge pixel coordinates, and the predefined spatial arrangement of the emitters 204. Since the emitters 204 project the laser beams 116 parallel to each other, the projections 118 will have the same spatial arrangement as the emitters 204 in any plane parallel to that of the emitters 204. Thus, for example, distortions in the spatial arrangement of the projections 118 relative to the predefined spatial arrangement of the emitters 204 can be attributed to a tilt of the surface 122-1 relative to the plane of the emitters 204.

In particular, a tilt angle α of the surface 122-1 relative to the plane of the emitters 204 can be calculated based on a first image distance m and a second image distance n (e.g. pixel distances between projection pixel coordinates of the projections 118) of an object of the known height h (e.g. the distance between projections 118, based on the predefined spatial arrangement of the emitters 204), and the constant k of the camera (e.g. as stored in the repository 262). For example, the tilt angle α may be calculated according to equation (1):

$$\alpha = \tan^{-1}\left(k\left(\frac{1}{n} - \frac{1}{m}\right)\right) \tag{1}$$

Having determined the tilt angle α of the surface 122-1, a length L of the surface 122-1 (i.e. between a first edge $e_1$ closer to the camera, and a second edge $e_2$ tilted by the tilt angle α away from the camera) can be determined based on the known height h, first and second pixel distances $q_1$ and $q_2$ representing distances between the edges $e_1$ and $e_2$ and a midpoint of the surface 122-1, and first and second image distances n' and m' representing the object of known height h at the edges $e_1$ and $e_2$. For example, the length L may be calculated according to equation (2):

$$L = \frac{h}{\cos\alpha}\left(\frac{q_1}{n'} + \frac{q_2}{m'}\right) \tag{2}$$

In other examples, the device 104 can be configured to determine the tilt angle α and the length L based on distances between the projections 118, angles between the projections 118, and the like using other geometric and/or trigonometric relationships.

Figure 5A:
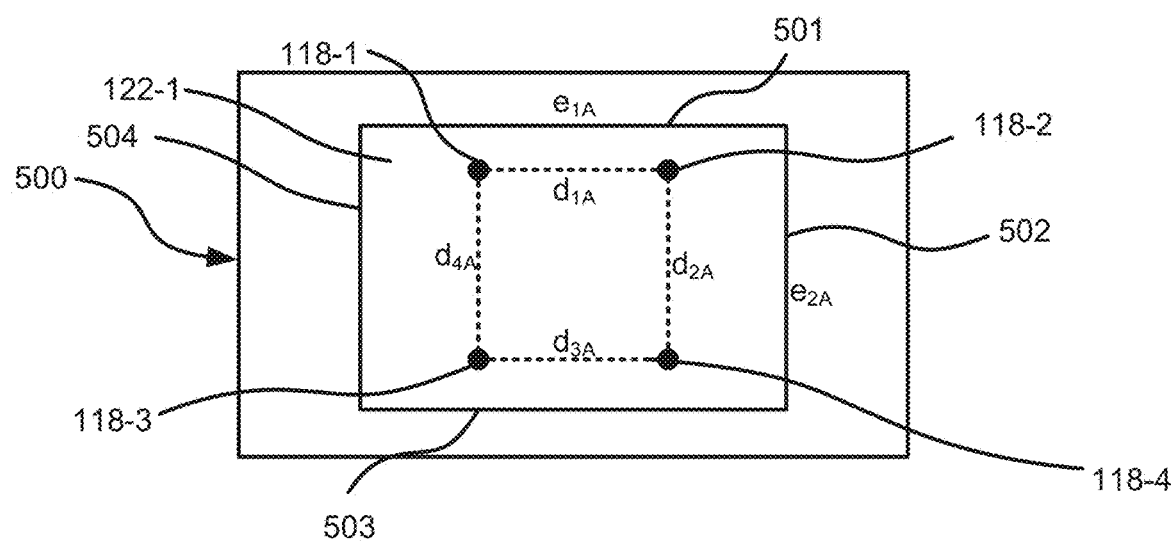
FIGS. 5A, 5B and 5C illustrates example images captured during performance of the method of FIG. 3.

FIG. 5A depicts an example image 500. The image 500 includes the surface 122-1 with the projections 118, with all other edges (e.g. of the box 120 and in the background) omitted, for example by filtering for only the relevant edges at block 315. The device 104 can determine a pixel distance $d_{1,4}$ between the projection pixel coordinates of the projections 118-1 and 118-2, a pixel distance $d_{2,4}$ between the projection pixel coordinates of the projections 118-2 and 118-4, a pixel distance $d_{3,4}$ between the projection pixel coordinates of the projections 118-3 and 118-4, and a pixel distance $d_{4A}$ between the projection pixel coordinates of the projections 118-1 and 118-3. In the image 500, the pixel distances $d_{1A}$ and $d_{3A}$ are equal and the pixel distances $d_{2A}$ and $d_{4A}$ are equal (i.e. they have maintained the rectangular spatial arrangement of the emitters 204), hence the device 104 can determine that the surface 122-1 is parallel to the plane of the emitters 204. For example, substituting $d_{1A}$ and $d_{3A}$ as the distances n and m respectively in equation (1) results in a tilt angle α of 0 degrees.

The device 104 is further configured to determine a pixel distance $e_{1A}$ between the edge pixel coordinates of edges 502 and 504, and a pixel distance $e_{2A}$ between the edge pixel coordinates of edges 501 and 503. In some implementations, the device 104 can determine a shortest distance between edge pixel coordinates of the corresponding edges. In other implementations, the device 104 can determine the vertices of the surface 122-1 using the points of intersection of the edges 501, 502, 503, and 504, and determine the pixel distances between vertices. The device 104 can then determine a length L of the surface 122-1 (and hence the box 120) based on the ratio of the pixel distance $d_{1A}$ to the pixel distance $e_{1A}$, as well as the predefined spatial arrangement of the emitters 204. For example, substituting a for 0 degrees, n' for $d_{2A}$ and m' for $d_{2A}$ results in L being the distance h between the emitters 204 multiplied by the sum of $q_1$ and $q_1$. Similarly, the device can determine a height H of the surface 122-1 (and hence the box 120) based on the ratio of the pixel distance $d_{2A}$ to the pixel distance $e_{2A}$, as well as the predefined spatial arrangement of the emitters 204.

For example, suppose the pixel distance $d_{1A}$ is 500 pixels and the pixel distance $e_{1A}$ is 1000 pixels. Further, suppose the emitters 204 are arranged in a square, with each edge being 5 cm apart. Since the surface 122-1 is parallel to the plane of the emitters 204, the projections 118 maintain the spatial arrangement of the emitters 204, and hence 500 pixels represents 5 cm. Accordingly, the pixel distance 1000 pixels represents 10 cm, and hence the length L of the box 120 is 10 cm.

Figure 5B:
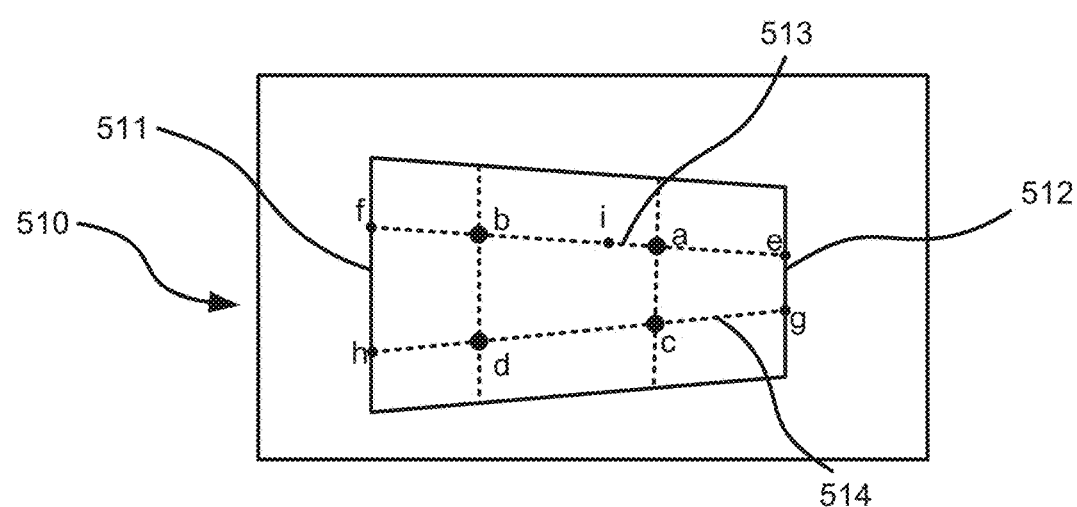

FIG. 5B depicts an example image 510 including the surface 122-1 with the projections 118, with all other edges omitted. In the image 520, the surface 122-1 is tilted in one axis relative to the plane of the emitters 204, hence the spatial arrangement of the projections 118 is distorted (i.e. non-rectangular). The device 104 can detect the projection pixel coordinates a, b, c, and d. The device 104 can further detect the edge pixel coordinates e, f, g, and h, based on the intersection between the edges 511 and 512, and the lines 513 and 514 extending between the projection pixel coordinates a and b, and c and d respectively. The device 104 can also determine a midpoint i along the line 513 in consideration of the tilt of the surface 122-1. The device 104 can determine the tilt angle α, for example using equation (1) and substituting distances ac and bd as the distances n and m respectively. The device 104 can then determine the length L of the surface 122-1, for example using equation (2) and substituting distances ei, if, eg, and fh as distances $q_1$, $q_2$, n' and m' respectively, as well as the tilt angle α as calculated from equation (1) and the known height h based on the predefined spatial arrangement. In some examples, the processor 250 is further configured to determine other geometric relationships (e.g. midpoints or the like) between the projection pixel coordinates and/or the edge pixel coordinates to assist in determining the dimension(s) of the surface 122-1.

For example, consider an image of the surface 122-1 having coordinates as given by Table 1, with h equal to 5.7 cm (i.e. the distance between the emitters 204), and the constant k equal to 3300.

TABLE 1

| | Pixel Coordinates | |
|---|---|---|
| Point | x Pixel Coordinate | y Pixel Coordinate |
| a | 1547 | 867 |
| b | 2223 | 821 |
| c | 1563 | 1473 |
| d | 2225 | 1503 |
| e | 809 | 907 |
| f | 3205 | 761 |
| g | 829 | 1449 |
| h | 3239 | 1539 |
| i | 1869 | 842 |

In accordance with equation (1), the tilt angle α is about 30 degrees, and in accordance with equation (2) the length L is about 24.5 cm.

Figure 5C:
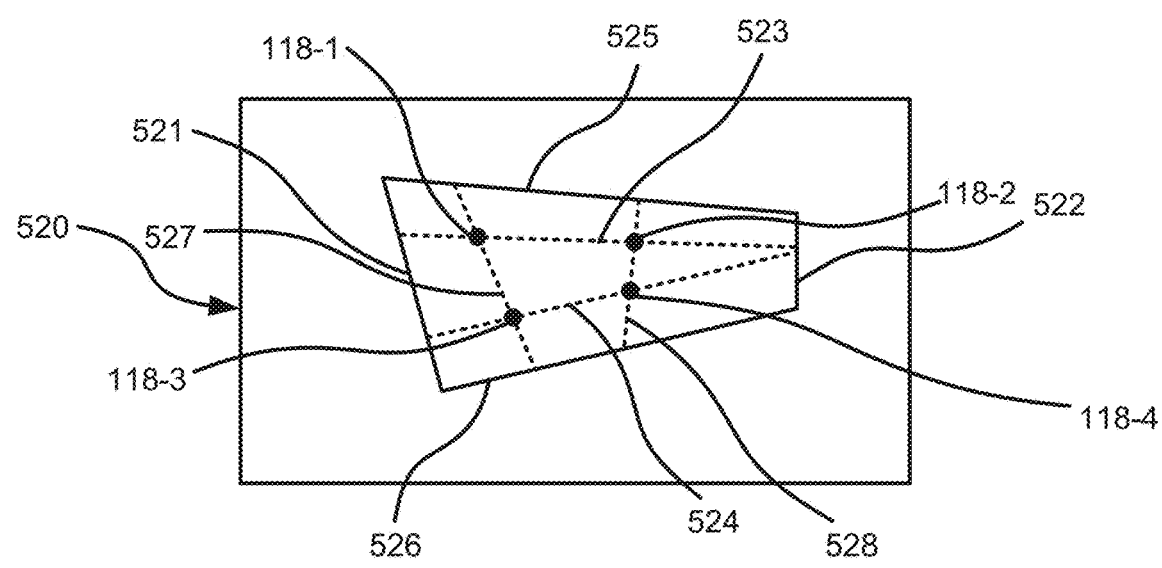

FIG. 5C depicts an example image 520 including the surface 122-1 with the projections 118, with all other edges omitted. In the image 520, the surface 122-1 is tilted in two axes relative to the plane of the emitters 204, hence the spatial arrangement of the projections 118 is distorted (i.e. non-rectangular). The device 104 can use the projection pixel coordinates, the edge pixel coordinates (for example, as framed by extending lines 523 and 524 through the projections 118 from edge 521 to 522, and lines 527 and 528 through projections 118 rom edges 525 and 526), as well as other geometric features such as midpoints, angles between the lines 523, 524, 527, and 528, and the like to determine the tilt angle α and a second tilt angle β with respect to a second axis. For example, the device 104 may use a variation based on equation (1) to account for the second tilt angle β. The device 104 is further configured to use the tilt angles α and β as well as the distances and other geometric properties of the projections 118, and the lines 523, 524, 527, and 528 to determine the length L of the surface 122-1.

In other examples, distortions in the spatial arrangement of the projections 118 can be attributed to a curvature of the surface. For example, in the example illustrated in FIG. 4B, the device 104 may be configured to determine a radius of curvature of the curved surface 414 based on the projections 416 of the laser planes on the curved surface 414. In particular, the device 104 can determine a curvature of the projections 416 and use the predefined spatial arrangement of the laser planes to determine the dimensions of the curved surface 414.

To dimension the box 120 (i.e. to determine the length, width and height of the box 120), the method 300 can be repeated for any two of the surfaces 122-1, 122-2, and 122-3. For example, an operator may move the device 104 laterally to repeat the method 300 for the two surfaces 122-1, and 122-2 (i.e. adjacent at an approximately vertical edge), and hence the device 104 may be configured to assume that the height H determined for the surface 122-1 is also the height of the surface 122-2. In other examples, the processor 250 can be configured to determine the dimensions of the surface 122-1, and use the dimensions and geometric properties of rectangular cuboid shapes (i.e. all adjacent surfaces 122 being perpendicular to one another) to determine the dimensions of the box 120. In further examples, the device 104 can be configured to project two laser beams 116-1 and 116-3 on the first surface 122-1 and two laser beams 116-2 and 116-4 on the second surface 122-2 and use the geometric properties of rectangular cuboid shapes (i.e. all surfaces 122 being perpendicular to one another) to determine the dimensions of the box.

Figure 6A:
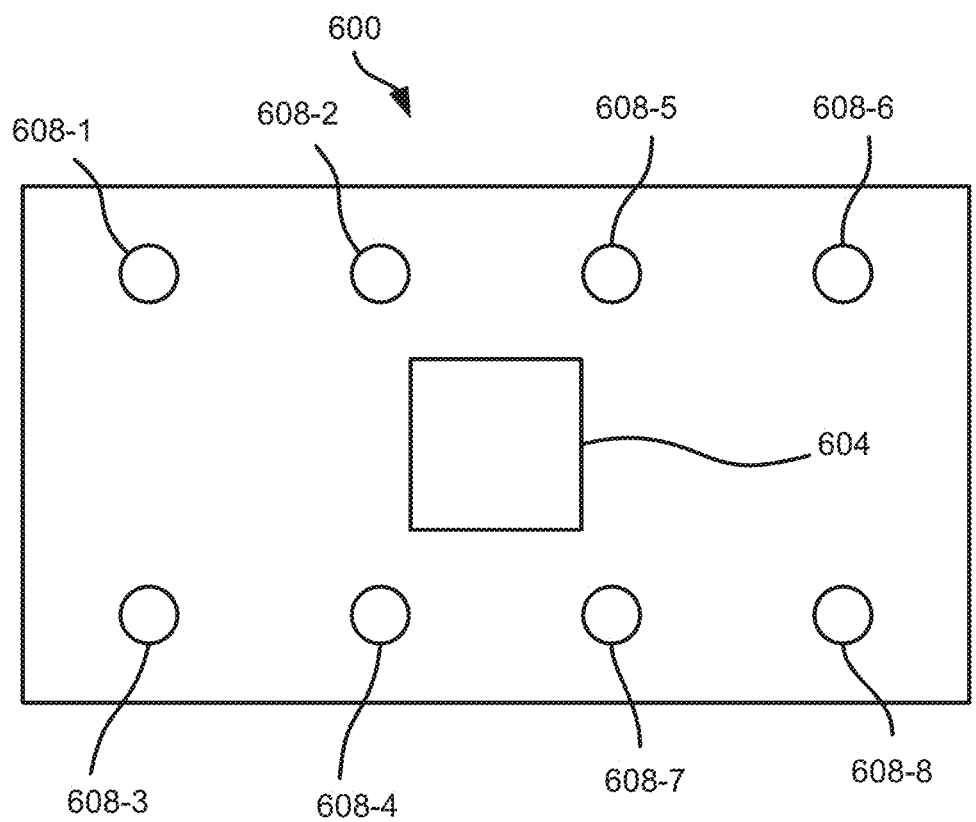
FIG. 6A depicts another example dimensioning device.
Figure 6B:
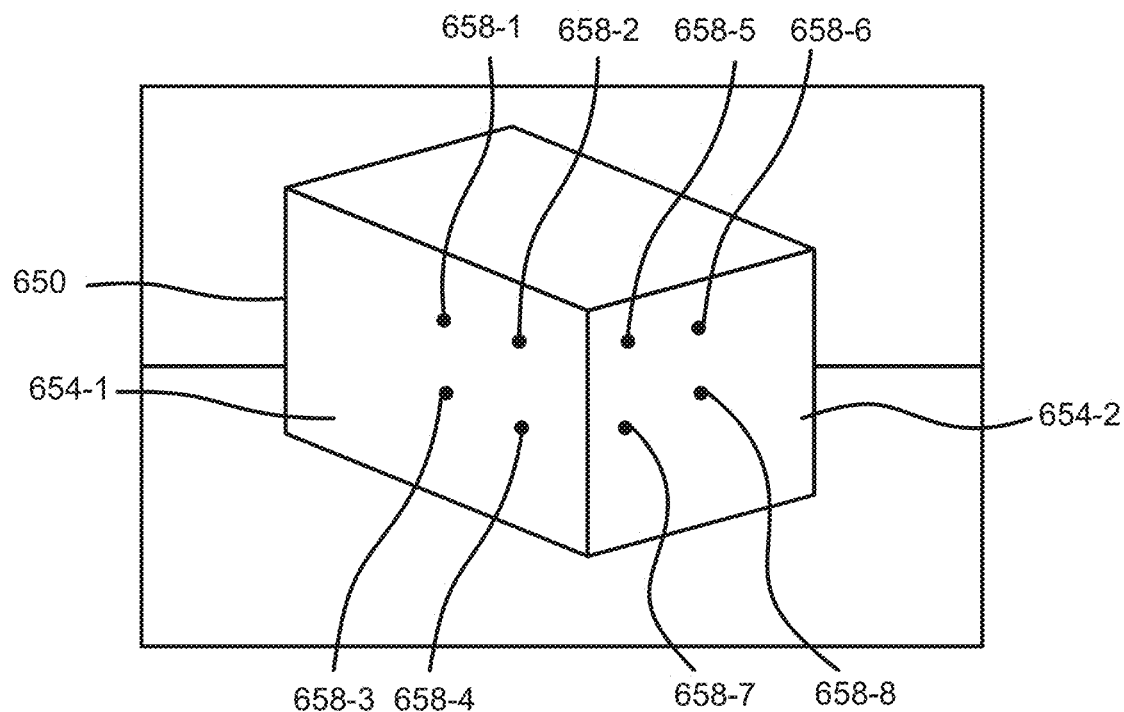
FIG. 6B depicts an example image captured by the dimensioning device of FIG. 6A.

In other examples, referring to FIG. 6A, a front view of another dimensioning device 600 is depicted. The dimensioning device 600 includes an image sensor 604 and a plurality of laser emitters 608-1, 608-2, 608-3, 608-4, 608-5, 608-6, 608-7, and 608-8. The device 600 can also include diffractive optical elements (not shown) associated with the respective laser emitters 608. The laser emitters 608 are disposed on the device 600 and are arranged in a 2×4 array. The laser emitters 608 are configured to emit laser beams parallel to each other in a direction towards the object for dimensioning. Referring to FIG. 6B, the laser emitters 608 are configured to project laser beams onto a first surface 654-1 and a second surface 654-2 of a box 650. In particular, the laser emitters 608-1, 608-2, 608-3, and 608-4 form projections 658-1, 658-2, 658-3, and 658-4 on the first surface 654-1, and the laser emitters 608-5, 608-6, 608-7, and 608-8 form projections 658-5, 658-6, 658-7, and 658-8 on the second surface 654-2.

Returning to FIG. 6A, the image sensor 604 is disposed on the device 600 and is configured to capture data representing the object (e.g. the box 650) toward which the device 600 is oriented for dimensioning. More particularly, in the present example, the image sensor 604 is configured to capture image data representing the box 650, including both the surfaces 654-1 and 654-2 and the projections 658 on the surfaces 654-1 and 654-2. Thus, the projections 658-1, 658-2, 658-3, and 658-4 on the first surface 654-1 allow dimensioning of the first surface 654-1, and projections 658-5, 658-6, 658-7, and 658-8 on the second surface 654-2 allow dimensioning of the second surface 654-1. Accordingly, a processor of the dimensioning device 600 can detect projection pixel coordinates, detect edge pixel coordinates, and determine dimensions of both surfaces 654-1 and 654-2 (and hence of the box 650) simultaneously.

Variations to the above systems and methods are contemplated. For example, in some embodiments, the performance of blocks 310 and 315 of the method 300 may be performed by an operator viewing the image on a display and identifying the projections and edges via an input of the device 104. Following the identification of the projection and edge pixel coordinates, the operator may initiate, via the input, the performance of block 320 by the device 104. In other embodiments, the device 104 can be configured to communicate the image data to the server 101, and performance of blocks 310, 315, and 315 may be performed by the server 101. In some embodiments, the method 300 may be initiated by a barcode scan or the like, for example identifying the object for dimensioning.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of dimensioning an object comprising:
projecting, from a plurality of laser emitters disposed on a dimensioning device and having a predefined spatial arrangement forming a plane, respective laser beams onto a surface of the object, the laser beams oriented parallel to each other;
controlling an image sensor of the dimensioning device, simultaneously with the projecting, to capture image data representing the surface and projections of the laser beams on the surface;
detecting projection pixel coordinates in the image data representing the projections of the laser beams on the surface;
detecting edge pixel coordinates in the image data representing edges of the surface; and
determining a dimension of the surface based on the projection pixel coordinates, the edge pixel coordinates, and the predefined spatial arrangement.

2. The method of claim 1, wherein the object is a box having a rectangular cuboid shape.

3. The method of claim 2, further comprising determining a tilt angle of the surface relative to the image sensor.

4. The method of claim 2, further comprising:
projecting, from the laser emitters, respective second laser beams onto a second surface of the object;
controlling the image sensor, simultaneously with projecting the second laser beams, to capture second image data representing the second surface and second projections of the second laser beams on the second surface; and
determining a dimension of the second surface based on the second image data and the predefined spatial arrangement.

5. The method of claim 2, further comprising:
projecting, from a plurality of further laser emitters disposed on the dimensioning device and having a predefined spatial arrangement forming a plane, simultaneously with the projecting the laser beams, a plurality of further laser beams onto a second surface of the object, the further laser beams oriented parallel to each other; and
determining a dimension of the second surface based on the image data and the predefined spatial arrangement, wherein the image data further represents the second surface and further projections of the further laser beams on the second surface.

6. The method of claim 2, wherein the image data further represents a second surface of the box, and further comprising determining a further dimension of the box based on the image data representing the second surface, and geometric properties of rectangular cuboid shapes.

7. The method of claim 1, wherein the laser beams form laser planes.

8. The method of claim 7, wherein the surface of the object is curved, and determining the dimension comprises determining a radius of curvature of the surface based on projections of the laser planes on the surface and the predefined spatial arrangement.

9. The method of claim 1, comprising projecting four laser emitters having a rectangular spatial arrangement.

10. The method of claim 1, wherein detecting the projection pixel coordinates comprises identifying regions of the image data having a predefined color.

11. A dimensioning device comprising:
a plurality of laser emitters having a predefined spatial arrangement forming a plane, the laser emitters configured to project respective laser beams oriented parallel to each other;
an image sensor configured to capture image data representing projections of the laser beams; and
a dimensioning processor configured to:
control the laser emitters to project the respective laser beams onto a surface of an object;
control the image sensor simultaneously with the projecting, to capture image data representing the surface and projections of the laser beams on the surface;
detect projection pixel coordinates in the image data representing the projections of the laser beams on the surface;
detect edge pixel coordinates in the image data representing edges of the surface; and
determine a dimension of the surface based on the projection pixel coordinates, the edge pixel coordinates, and the predefined spatial arrangement.

12. The dimensioning device of claim 11, wherein the object is a box having a rectangular cuboid shape.

13. The dimensioning device of claim 12, wherein the dimensioning processor is further configured to determine a tilt angle of the surface relative to the image sensor.

14. The dimensioning device of claim 12, further comprising:
a plurality of further laser emitters disposed on the dimensioning device and having a predefined spatial arrangement forming a plane, the further laser emitters configured to project respective further laser beams oriented parallel to each other; and
wherein the dimensioning processor is further configured to determine a dimension of a second surface based on the image data and the predefined spatial arrangement, wherein the image data further represents the second surface and further projections of the further laser beams on the second surface.

15. The dimensioning device of claim 12, wherein the image data further represents a second surface of the box, and wherein the dimensioning processor is further configured to determine a further dimension of the box based on the image data representing the second surface and geometric properties of rectangular cuboid shapes.

16. The dimensioning device of claim 11, further comprising a plurality of diffractive optical elements corresponding to the plurality of laser emitters, the diffractive optical elements configured to interact with the laser beams to form laser planes.

17. The dimensioning device of claim 16, wherein the surface of the object is curved, and wherein the dimensioning processor is configured to determine a radius of curvature of the surface based on projections of the laser planes on the surface and the predefined spatial arrangement.

18. The dimensioning device of claim 11, wherein the plurality of laser emitters comprises four laser emitters having a rectangular spatial arrangement.

19. The dimensioning device of claim 11, wherein the dimensioning processor is configured to detect projection pixel coordinates by identifying regions of the image data having a predefined color.

20. A non-transitory computer-readable medium storing a plurality of computer-readable instructions executable by a dimensioning controller, wherein execution of the instructions configures the dimensioning controller to:

project, from a plurality of laser emitters disposed on a dimensioning device and having a predefined spatial arrangement forming a plane, respective laser beams onto a surface of the object, the laser beams oriented parallel to each other;

control an image sensor of the dimensioning device, simultaneously with the projecting, to capture image data representing the surface and projections of the laser beams on the surface;

detect projection pixel coordinates in the image data representing the projections of the laser beams on the surface;

detect edge pixel coordinates in the image data representing edges of the surface; and determine a dimension of the surface based on the projection pixel coordinates, the edge pixel coordinates, and the predefined spatial arrangement.

* * * * *